United States Patent
Lennartson et al.

(10) Patent No.: US 8,385,958 B2
(45) Date of Patent: Feb. 26, 2013

(54) METHOD OF TRANSMITTING DOWN LINK DATA

(75) Inventors: Benny Lennartson, Hagersten (SE); Hakan Axelsson, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 671 days.

(21) Appl. No.: 12/596,682

(22) PCT Filed: Apr. 23, 2007

(86) PCT No.: PCT/SE2007/050262
§ 371 (c)(1),
(2), (4) Date: Oct. 20, 2009

(87) PCT Pub. No.: WO2008/130300
PCT Pub. Date: Oct. 30, 2008

(65) Prior Publication Data
US 2010/0136991 A1    Jun. 3, 2010

(51) Int. Cl.
*H04W 4/00* (2009.01)
(52) U.S. Cl. .......................................... 455/503; 455/62
(58) Field of Classification Search ............... 455/422.1, 455/436, 450, 452, 502, 503, 517, 67.11, 455/67.13, 67.16, 62, 63; 375/355, 356; 370/329, 349
See application file for complete search history.

(56) References Cited

U.S. PATENT DOCUMENTS

| | | | | |
|---|---|---|---|---|
| 4,516,269 A | * | 5/1985 | Krinock | 455/503 |
| 6,049,720 A | * | 4/2000 | Rude | 455/503 |
| 7,450,944 B2 | * | 11/2008 | Leelahakriengkrai et al. | 455/436 |
| 2006/0092877 A1 | | 5/2006 | Niemela | |
| 2006/0262741 A1 | | 11/2006 | Niemela | |
| 2006/0280142 A1 | | 12/2006 | Damnjanovic et al. | |

FOREIGN PATENT DOCUMENTS

| | | |
|---|---|---|
| EP | 1598953 A1 | 11/2005 |
| WO | 02/093969 A1 | 11/2002 |

* cited by examiner

*Primary Examiner* — Thanh Le
(74) *Attorney, Agent, or Firm* — Coats & Bennett, P.L.L.C.

(57) ABSTRACT

In a cellular radio system data is transmitted to a Dual Carrier mobile station from two different cells during a data transfer. Hereby existing hardware in a GSM system can be utilized more efficiently. The data transmission from the two cells can be frame synchronized. Frame synchronization can for example be obtained by transmitting data from two cells located on the same radio base station site.

12 Claims, 2 Drawing Sheets

METHOD OF TRANSMITTING DOWN LINK DATA

TECHNICAL FIELD

The present invention relates to a method and a device for transmission of downlink data, in particular user data from a cellular radio system to a mobile station connected to the cellular radio system.

BACKGROUND

Conventional handsets in Global System for Mobile telephony (GSM) devices today have normally only one receiver/transmitter (RX/TX) that are used for connecting to a GSM radio system over a radio interface. Hence, the handset can only transmit and receive on one frequency at the time.

The base stations used for establishing the radio interface to the GSM system similarly have a limited number of transmitters/receivers. There is a constant drive to minimize the number of transmitters/receivers in the base station to reduce costs both in terms of hardware but also in terms of maintenance. Thus, the number of transmitters/receivers should therefore be as low as possible without making the number so low that the quality of service to the subscribers is reduced to an unacceptable level. Also, the complexity of the transmitters/receivers should be low for reducing costs. In a typical base station there can be, for example, four transmitters/receivers for each cell served by the base station. In such a scenario, only one of the transmitters/receivers may be designed to support EGPRS because such a transceiver is more complex and hence more costly both to manufacture and to maintain.

In release 7 of the 3GPP specifications a downlink dual carrier is introduced. The downlink dual carrier GSM EDGE Radio Access Network (GERAN) makes it possible for the mobile station to receive data on two different frequencies simultaneously. The reason for adding a new downlink carrier is to increase the throughput for Enhanced GPRS (EGPRS). The second carrier enables the mobile station to receive twice as many time slots as with a conventional Enhanced GPRS (EGPRS) system. To be able to benefit from this new feature the mobile station needs to have two receivers. In addition each cell must have two transmitters supporting EGPRS. This is also described in the US patent application Nos. US20060092877 and US20060232741.

To provide each cell with two transmitters and in particular two transmitters having EGPRS may turn out to be unwarranted for a particular cell for the normal load. On the other hand subscribers may demand high throughput in all areas of the GSM network.

Hence, there exists a need for a method and a system that is able to provide high throughput and at the same time keep the costs for additional hardware in terms of transmitters, in particular complex base station transmitters, to a minimum.

SUMMARY

It is an object of the present invention to overcome or at least reduce some of the problems associated with the existing solutions for providing high throughput.

It is another object of the present invention to provide a method and a system that is capable of providing high throughput while adding a minimum of additional hardware.

These objects and others are obtained by the method and system as set out in the appended claims. Thus, by transmitting data to a Dual Carrier mobile station from two different cells during a data transfer, existing hardware in a GSM system can be utilized more efficiently.

In order for the data to be easy to receive by the dual carrier mobile station, the data transmission from the two cells is preferably frame synchronized. In one embodiment frame synchronization is obtained by transmitting data from two cells located on the same radio base station site.

Using the method and system in accordance with the invention will provide a high throughput without having to add any additional hardware. Also, the increased throughput is achieved without having to change any existing standards for mobile stations, which is a major advantage.

BRIEF DESCRIPTION OF THE DRAWINGS

The present invention will now be described in more detail by way of non-limiting examples and with reference to the accompanying drawings, in which.

DETAILED DESCRIPTION

Figure 1:
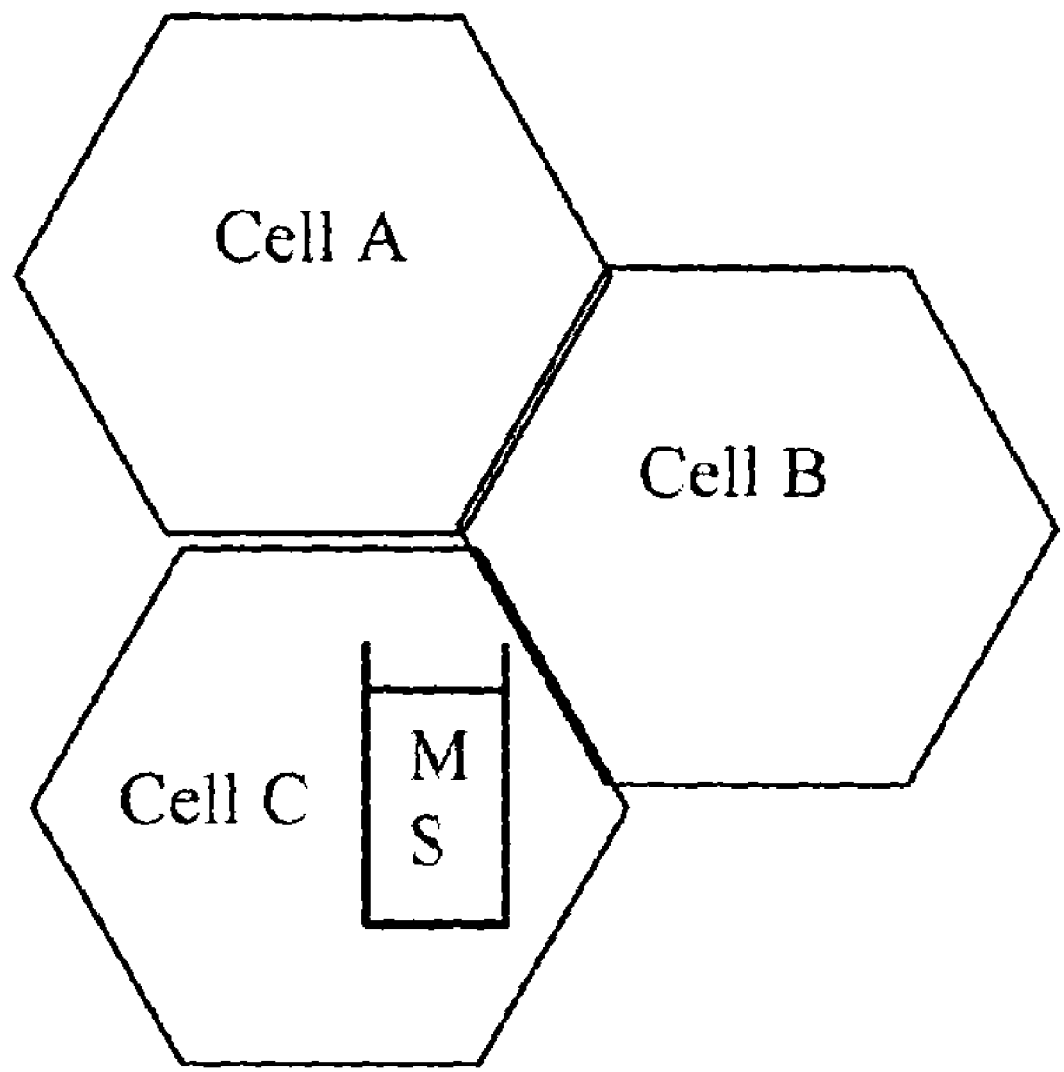
FIG. 1 is a view illustrating a GSM system supporting simultaneous transmission of data to a subscriber from two different cells.

In FIG. 1 a view illustrating a GSM system supporting simultaneous transmission of data to a subscriber from two different cells is shown. In accordance with the system as described herein a mobile station (MS) can be assigned to different cells at the same time when setting up a session. In one embodiment the mobile station is allocated two carriers from two different cells at the same site. In such a case the cells within a site are frame synchronized without a need for a synchronization protocol between different radio base stations since synchronization can be obtained on site.

In the example illustrated in FIG. 1 the data is transmitted in the same time slots from different cells, for example Cell B and Cell C, using different MAIO. A mobile allocation index offset (MAIO) refers a time delay separating traffic channels. When a GSM mobile telephone is served by a cell that is hopping over a set of frequencies, the separate traffic channels hop over the allocated frequencies according to a hopping sequence number (HSN). The traffic channels with the same HSN hop over the same frequencies in the same order but are separated in time by a mobile allocation index offset (MAIO). The smallest amount of interference on a site is achieved if it is possible to synchronize all channels on the site and separate the channels using the MAIO.

However, if the cells to which the two connections are established belong to two different radio base station sites, the mobile station can still use the data transmitted from the network as long as the cells are frame synchronized. The mobile station is able to use the information as long as the frame alignment between the two carriers is not too big.

In case the same Training Sequence Code (TSC) is not used in the two cells, then the TSC used in the cell where the mobile station is camping is preferably used for all transmissions to this particular mobile station, even though transmission is performed in two different cells.

Because there is presently no standard supporting dual carrier in the uplink it is presently preferred to transmit uplink data assigned to one cell.

The assignment from a single carrier, in one cell, to a dual carrier, in two cells can be executed with a single assignment message. In such a scenario the mobile station is not aware that it is assigned to two different cells. Therefore there is no extra impact on mobile implementation from this solution, on top of the Dual Carrier in downlink support.

Figure 2:
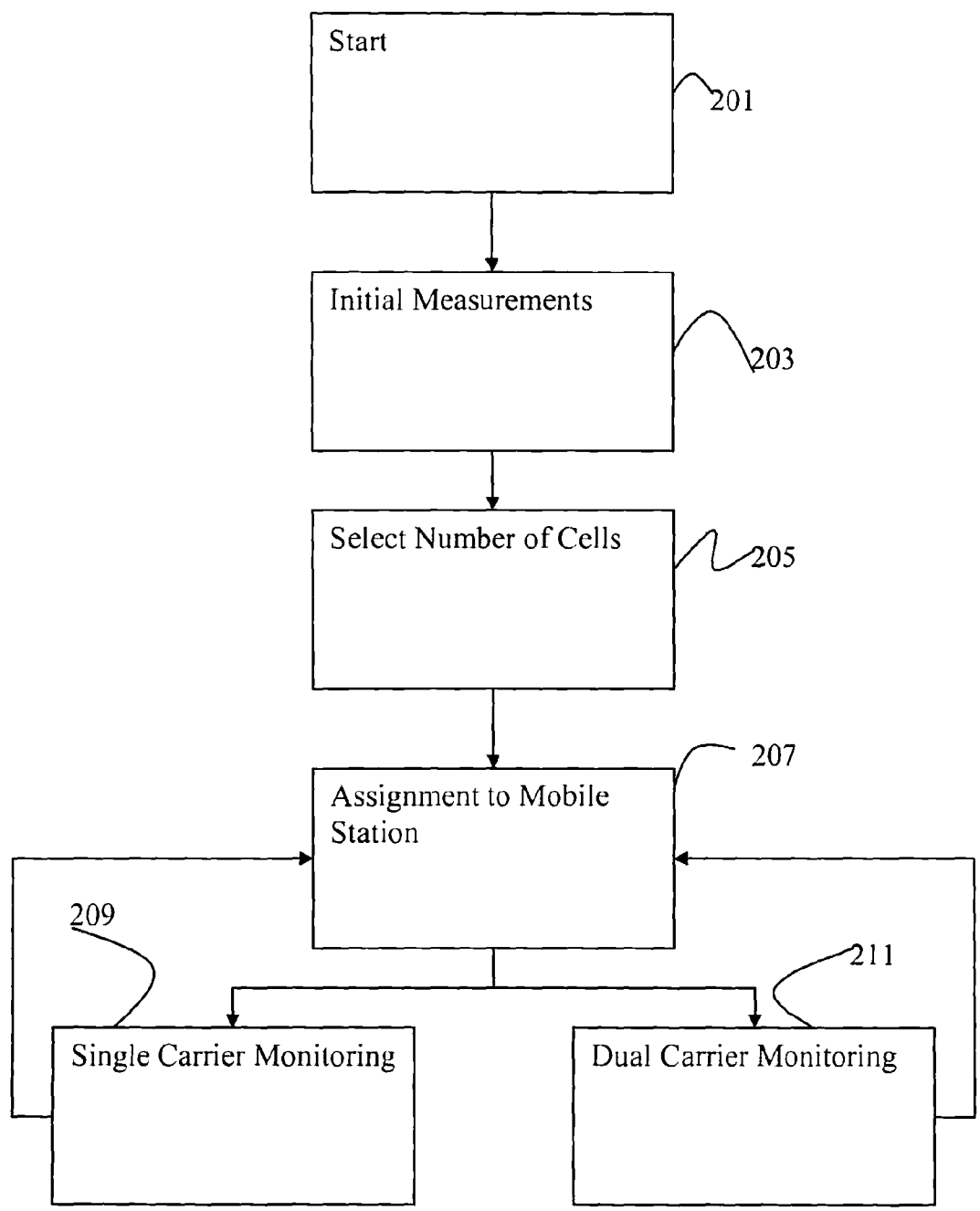
FIG. 2 is a flow chart illustrating steps performed when setting up a connection over two different cells to and from a mobile station.

FIG. 2 illustrates procedural steps performed when establishing a down link from two different cells to a mobile station camping in one cell. First, in a step 201, the mobile station (MS) performs configuration in single carrier mode. Next, in a step 203, the mobile station performs initial measurements by measuring the neighbor cells in order to find the best cell to be connected to.

Thereupon, a selection of a number of cells is performed by the cellular radio network in a step 205. Thus, based on the measurements performed by the mobile station and traffic situation, and also on the hardware configuration in the area where the mobile station is connected to the cellular radio network, the network makes a decision if the mobile station should be assigned dual carriers in one cell or dual carriers from two different cells. In some cases the decision may even be that the mobile station is only assigned one carrier, all depending on the above mentioned decision.

Next, in a step 207, an assignment to the mobile station is performed. The assignment is performed in accordance with the decision made in step 205. If a dual carrier assignment is performed, the procedure proceeds to a step 211, else the procedure ends in a step 209, where the procedure can continue to check if it is possible to make a re-assignment from one carrier to dual carriers.

In step 211, during the dual carrier configuration, the radio conditions are monitored to ensure that both carriers have sufficient radio coverage to efficiently maintain the configuration. If and when the radio conditions of one of the carriers become poor and below some pre-set threshold value, a re-configuration procedure is triggered to fall back into single carrier mode.

The re-assignment from one carrier, in one cell, to dual carriers, in two cells, will be very fast since the mobile re-acts as for any other intra-cell re-configuration. This procedure can also be utilized for a single-carrier assignment. By re-assigning the single-carrier assignment to another cell, e.g. for cell load sharing reasons, the interruption time for this "cell change" is limited to only 60 ms. In such a scenario the mobile station will still camp in the original cell, but will be assigned radio resources in another cell.

Using the system and method as described herein, it is possible to increase efficiency within a site without adding hardware resources. For example only one EDGE carrier per cell may be configured, but dual carrier mobiles will still be able to utilize the double throughput that dual carrier downlink offer. Also, the implementation does not need any changes in existing standards including standards for mobile terminals.

The invention claimed is:

1. A Global System for Mobile telephony (GSM) system for transmitting downlink data to a mobile station simultaneously on two different carriers, said system comprising:
   a first radio transmitter in a first cell transmitting on a first one of the two different carriers;
   a second radio transmitter in a second cell transmitting on a second one of the two different carriers, wherein said first and second transmitters are configured to simultaneously transmit the downlink data to the mobile station on the first and second carriers; and
   radio base station circuits configured to switch between simultaneous transmission of the data on the two different carriers from the two different cells and at least one other mode of downlink data transmission, in response to one or more of: mobile station measurements, a current traffic situation, and a hardware configuration.

2. The system of claim 1, further comprising one or more radio base stations associated with the first and second transmitters and configured for frame synchronizing the data transmission from the two different cells.

3. The system of claim 2, wherein the two different cells are served by the same radio base station site.

4. The system of claim 1, wherein the first and second transmitters are configured to use the same Training Sequence Code for all data transmission to the mobile station.

5. The system of claim 1, wherein the at least one other mode comprises a single carrier downlink data transmission, such that the mode switches between a dual link data transmission on the first and second carriers and a single link data transmission on one carrier.

6. The system according to claim 1, wherein the first transmitter comprises a first EGPRS transmitter at a first base station, and the second transmitter comprises a second EGPRS transmitter.

7. A method of transmitting downlink data to a mobile station simultaneously on two different carriers in a Global System for Mobile telephony (GSM) system, the method comprising:
   configuring first and second transmitters transmitting on two different carriers from two different cells to transmit the downlink data to the mobile station in a dual link transmission;
   simultaneously transmitting the downlink data on the two different carriers; and
   switching between simultaneous transmission of the downlink data on the two different carriers from the two different cells and at least one other mode of downlink data transmission in response to one or more of: mobile station measurements; a current traffic situation; and a hardware configuration.

8. The method of claim 7, further comprising frame synchronizing the downlink data transmission from the two different cells.

9. The method of claim 8, wherein configuring first and second transmitters transmitting on two different carriers from two different cells to transmit the downlink data to the mobile station in a dual link transmission comprises configuring two different cells of the same radio base station site to transmit the downlink data.

10. The method of claim 7, further comprising using the same Training Sequence Code for all data transmissions to the mobile station.

11. The method of claim 7, wherein the at least one other mode comprise a single carrier downlink data transmission.

12. The method of claim 7, further comprising;
   switching from transmitting the downlink down link data via the first and second carriers in a dual carrier transmission mode, to transmitting the downlink data on one carrier in a single carrier transmission mode, in response to detecting that radio conditions for one of the first and second carriers has fallen below a pre-set threshold.

\* \* \* \* \*